(12) United States Patent
Ohashi

(10) Patent No.: US 9,431,897 B2
(45) Date of Patent: Aug. 30, 2016

(54) ELECTRIC DEVICE

(71) Applicant: Sony Computer Entertainment Inc., Tokyo (JP)

(72) Inventor: Tsuyoshi Ohashi, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 442 days.

(21) Appl. No.: 13/945,227

(22) Filed: Jul. 18, 2013

(65) Prior Publication Data

US 2014/0028277 A1 Jan. 30, 2014

(30) Foreign Application Priority Data

Jul. 24, 2012 (JP) ................. 2012-163610

(51) Int. Cl.
*H02M 3/02* (2006.01)
*H02J 7/00* (2006.01)

(52) U.S. Cl.
CPC .............. *H02M 3/02* (2013.01); *H02J 7/0065* (2013.01)

(58) Field of Classification Search
CPC ................................ H02M 3/02; H02J 7/0065
USPC ........................................................ 323/299
See application file for complete search history.

(56) References Cited

U.S. PATENT DOCUMENTS

| 5,387,820 | A | 2/1995 | Imagawa | |
|---|---|---|---|---|
| 5,684,392 | A | 11/1997 | Chang | |
| 2001/0030528 | A1* | 10/2001 | Ootani | H02M 3/158 323/272 |
| 2009/0278506 | A1* | 11/2009 | Winger | H02J 7/0068 320/160 |

FOREIGN PATENT DOCUMENTS

| JP | 05049179 | A | | 2/1993 |
|---|---|---|---|---|
| JP | H05227655 | | * | 3/1993 |
| JP | 05227655 | A | | 9/1993 |
| JP | 2005131770 | | * | 5/2005 |
| JP | 2005131770 | A | | 5/2005 |

OTHER PUBLICATIONS

JP Office Action with English translation for corresponding JP Patent Application No. 2012-163610, dated Apr. 22, 2014.

* cited by examiner

*Primary Examiner* — Kenneth B Wells
*Assistant Examiner* — James P Evans
(74) *Attorney, Agent, or Firm* — Matthew B. Dernier, Esq.

(57) ABSTRACT

Provided is an electric device, including: a secondary battery; and a power supply circuit for dropping an input voltage which is input from the secondary battery to an output voltage and outputting the output voltage to a load, in which the output voltage is stepwise dropped in accordance with the drop of the input voltage.

7 Claims, 1 Drawing Sheet though a voltage of a secondary battery gradually drops as the remaining battery charge decreases. On the other hand, a predetermined required voltage is usually set to a load which operates by electric power supplied by a secondary battery, and it is required to supply electric power in accordance with the required voltage. The required voltage is a voltage which is necessary for the load to normally operate to satisfy the performance specification, and is a specified value determined in advance with respect to the load. Depending on the kinds of the secondary battery and the load, there is a case in which the battery voltage of the secondary battery in a fully charged state exceeds the required voltage of the load, but, when the secondary battery approaches a fully discharged state, the battery voltage of the secondary battery falls below the required voltage of the load. In such a case, a power supply circuit which supplies electric power to the load includes a booster circuit for boosting the battery voltage of the secondary battery so that, even when the battery voltage of the secondary battery drops, the required voltage can be output to the load.

SUMMARY OF THE INVENTION

Mounting a booster circuit may result in size increase and cost increase of the power supply circuit. The present invention has been made in view of these circumstances, and it is an object of the present invention to provide an electric device which can supply electric power to a load with as much stability as possible without a booster circuit, and a method of controlling a power supply circuit which is built in the electric device.

According to an exemplary embodiment of the present invention, there is provided an electric device including: a secondary battery; and a power supply circuit for dropping an input voltage which is input from the secondary battery to an output voltage and outputting the output voltage to a load, in which the power supply circuit stepwise drops the output voltage in accordance with a drop of the input voltage.

Further, according to another exemplary embodiment of the present invention, there is provided a method of controlling a power supply circuit which drops an input voltage that is input from a secondary battery to an output voltage and outputs the output voltage to a load, the method including dropping stepwise the output voltage when the input voltage drops.

BRIEF DESCRIPTION OF THE DRAWINGS

In the accompanying drawings.

DETAILED DESCRIPTION OF THE INVENTION

An embodiment of the present invention is described in detail in the following with reference to the attached drawings.

Figure 1:
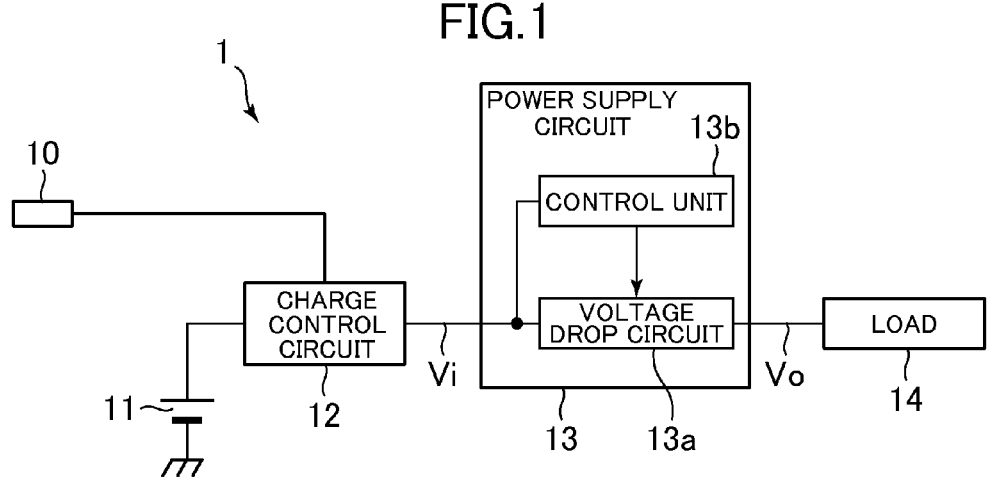
FIG. 1 is a circuit block diagram of an electric device according to an embodiment of the present invention.

FIG. 1 is a circuit block diagram of an electric device 1 according to an embodiment of the present invention. As illustrated in FIG. 1, the electric device 1 includes a power supply terminal 10, a secondary battery 11, a charge control circuit 12, a power supply circuit 13, and a load 14. The electric device 1 may be a device of various kinds, which operates with the secondary battery 11 being used as an electric power supply source, such as a hand-held game machine, a cellular phone, or a notebook personal computer.

The power supply terminal 10 is a terminal connected to an external electric power supply source (for example, a USB host or an AC adaptor for supplying electric power from commercial power supply). The secondary battery 11 is charged with electric power supplied from an electric power supply source connected to the power supply terminal 10.

The secondary battery 11 is a rechargeable battery such as a lithium ion battery, and is charged with electric power supplied from the outside of the electric device 1 and supplies electric power accumulated therein by the charge to the load 14 in the electric device 1.

The charge control circuit 12 is an integrated circuit or the like, and supplies electric power supplied from the electric power supply source connected to the power supply terminal 10 to the secondary battery 11 so as to charge the secondary battery 11. Further, the charge control circuit 12 outputs electric power supplied from the secondary battery 11 to the power supply circuit 13.

The power supply circuit 13 is an integrated circuit or the like, and transforms electric power supplied via the charge control circuit 12 from the secondary battery 11 and outputs the transformed electric power to the load 14. A voltage which is input from the secondary battery 11 to the power supply circuit 13 and a voltage which is output from the power supply circuit 13 to the load 14 are hereinafter referred to as an input voltage Vi and an output voltage Vo, respectively. As illustrated in FIG. 1, the power supply circuit 13 includes a voltage drop circuit 13a and a control unit 13b.

The voltage drop circuit 13a is a low drop-out (LDO) regulator, a DC/DC converter, or the like, and drops the input voltage Vi to the output voltage Vo and outputs the output voltage Vo. Specifically, the voltage drop circuit 13a controls the output voltage Vo to be maintained at a predetermined target voltage which is lower than the input voltage Vi. Note that, in order to output to the load 14 a predetermined output voltage Vo with stability, generally, the difference between the input voltage Vi and the output voltage Vo cannot be zero, and a potential difference to some extent is necessary therebetween. The control unit 13b monitors the value of the input voltage Vi, and in accordance with the monitored value, changes the target voltage of the voltage drop circuit 13a. In particular, in this embodiment, the control unit 13b stepwise drops the target voltage of the voltage drop circuit 13a in accordance with the drop in the input voltage Vi. Specific control by the control unit 13b is described later.

The load 14 is a circuit for realizing the intrinsic function of the electric device 1, and, for example, when the electric device 1 is an information processing device such as a hand-held game machine, the load 14 may be an arithmetic element, a storage element, or the like. The load 14 operates by electric power supplied from the power supply circuit 13. A predetermined required voltage Vo1 is set to the load 14 in accordance with the circuit configuration thereof or the like. The required voltage Vo1 is a voltage which is necessary for the load 14 to normally operate. The load 14 is designed to satisfy the performance specification which is originally supposed by electric power with the required voltage Vo1 supplied thereto.

Figure 2:
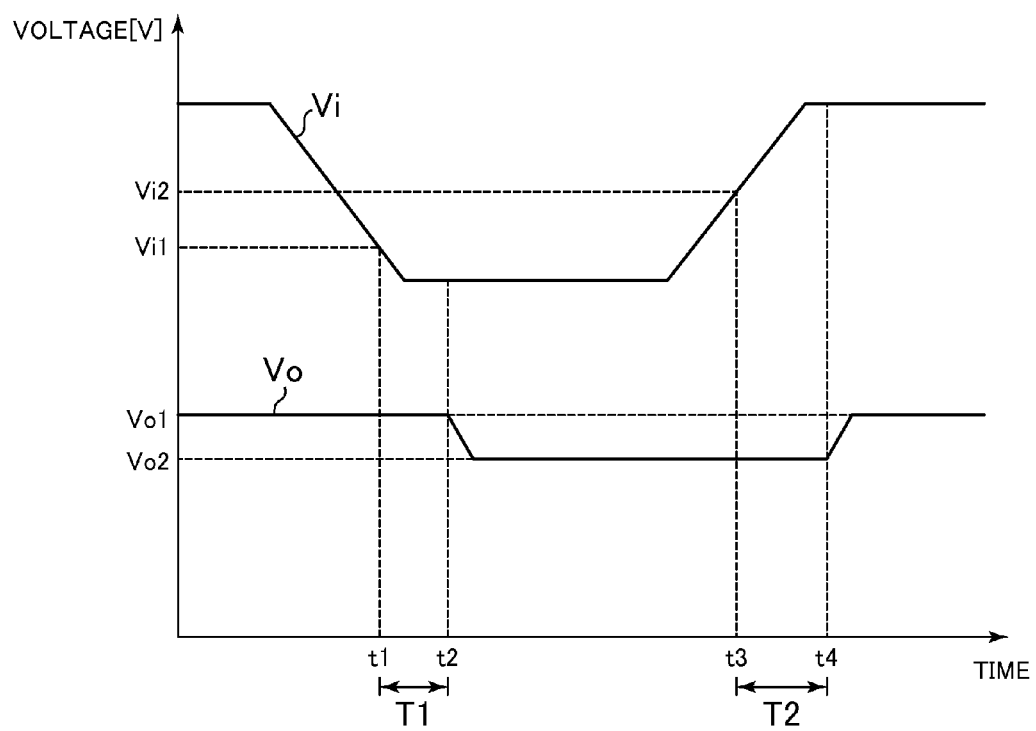
FIG. 2 is a graph showing the relationship between the input voltage and the output voltage of a power supply circuit.

Control to be realized by the power supply circuit 13 in this embodiment is described in the following with reference to a graph shown in FIG. 2. The graph of FIG. 2 shows change in the input voltage Vi and the output voltage Vo over time under circumstances where, first, due to the supply of electric power to the load 14, the remaining charge of the secondary battery 11 gradually decreases to approach a fully discharged state, and after that, due to the charging by the charge control circuit 12, the remaining charge of the secondary battery 11 increases again.

First, during a time period in which the input voltage Vi is equal to or higher than a predetermined first threshold value Vi1, the control unit 13b sets the target voltage of the voltage drop circuit 13a to the required voltage Vo1 of the load 14. Therefore, the output voltage Vo of the voltage drop circuit 13a is maintained at the required voltage Vo1, and the load 14 normally operates.

When the remaining charge of the secondary battery 11 decreases due to the supply of electric power to the load 14, the input voltage Vi gradually drops accordingly. As a result, the input voltage Vi falls below the predetermined first threshold value Vi1 at a certain timing (Time t1 of FIG. 2). When the state in which the input voltage Vi is below the first threshold value Vi1 continues for a first time period T1 which is determined in advance, the control unit 13b which monitors the input voltage Vi changes the target voltage of the voltage drop circuit 13a from the required voltage Vo1 to a voltage Vo2 (Time t2). In this case, the voltage Vo2 is a value determined in advance and is lower than the required voltage Vo1. In accordance with this change in the target voltage, the output voltage Vo of the voltage drop circuit 13a drops to the voltage Vo2. The voltage Vo2 is lower than the required voltage Vo1, and thus, in this state, the performance of the load 14 may not be adequately offered. For example, when the load 14 is a communication circuit for outputting a radio communication signal, adverse effects may arise such as shortened communication distance with which radio communication is possible. However, in the case where the difference between the required voltage Vo1 and the voltage Vo2 is not so large, even when the output voltage Vo drops to the voltage Vo2, the load 14 can continue to operate while offering its performance to some extent.

After that, when charging of the secondary battery 11 starts, the input voltage Vi begins to rise again. As a result, the input voltage Vi becomes higher than a predetermined second threshold value Vi2 at a certain timing (Time t3). When the state in which the input voltage Vi is equal to or higher than the second threshold value Vi2 continues for a second time period T2 which is determined in advance, the control unit 13b changes the target voltage of the voltage drop circuit 13a from the voltage Vo2 to the required voltage Vo1 (Time t4). This raises the output voltage Vo of the voltage drop circuit 13a to the required voltage Vo1. From that point of time, until the input voltage Vi falls below the first threshold value Vi1 again, electric power is supplied to the load 14 with the required voltage Vo1.

As described above, when the input voltage Vi falls below the first threshold value Vi1, the control unit 13b drops the output voltage Vo of the voltage drop circuit 13a to the voltage Vo2 which is lower than the required voltage Vo1. This enables input of the required voltage Vo1 to the load 14 for a time as long as possible, and the output voltage Vo to the load 14 can be dropped only when the input voltage Vi drops too much to maintain the required voltage Vo1. Note that, generally, the battery voltage of the secondary battery 11 does not linearly drop as the remaining battery charge decreases. Specifically, there is a tendency that the battery voltage of the secondary battery 11 hardly drops immediately after the start of the use but drops steeply when the battery approaches the fully discharged state. Therefore, according to the control described above, for a relatively long time until the battery capacity approaches the fully discharged state, supply of electric power to the load 14 with the required voltage Vo1 can be maintained.

Note that, the second threshold value Vi2 may be the same as the first threshold value Vi1, but, in the example shown in FIG. 2, the second threshold value Vi2 is higher than the first threshold value Vi1. This is for the purpose of providing hysteresis for the switching of the target voltage of the voltage drop circuit 13a to prevent frequent change in the output voltage Vo.

Further, when the input voltage Vi transits from the state of being equal to or higher than the first threshold value Vi1 to the state of being lower than the first threshold value Vi1, the control unit 13b does not immediately switch the target voltage of the voltage drop circuit 13a to the voltage Vo2, but waits until the state in which the input voltage Vi is lower than the first threshold value Vi1 continues for the predetermined first time period T1 and then drops the output voltage Vo. Similarly, when the input voltage Vi transits from the state of being lower than the second threshold value Vi2 to the state of being equal to or higher than the second threshold value Vi2, the control unit 13b waits until the state in which the input voltage Vi is equal to or higher than the second threshold value Vi2 continues for the predetermined second time period T2 and then raises the output voltage Vo. This is also for the purpose of preventing frequent change in the target voltage of the voltage drop circuit 13a. Note that, the first time period T1 and the second time period T2 may have the same length, but, in this case, the first time period T1 is shorter than the second time period T2. This is because of the necessity of dropping the target voltage relatively rapidly due to the difficulty in maintaining the output characteristics of the voltage drop circuit 13a when, in particular, the input voltage Vi drops and the difference between the input voltage Vi and the target voltage becomes smaller.

The electric device 1 according to this embodiment described above eliminates the necessity of boosting the voltage by a booster circuit for supplying electric power to the load 14. On the other hand, by changing the output voltage Vo in accordance with change in the input voltage Vi, differently from a case in which electric power is always supplied with the voltage Vo2 during the operation of the load 14, electric power can be supplied to the load 14 with the required voltage Vo1 for a relatively long time period.

Note that, the present invention is not limited to the embodiment described above. For example, in the above description, only one threshold value is set for switching the target voltage when the input voltage Vi drops and only one threshold value is set for switching the target voltage when the input voltage Vi rises, and the control unit 13b switches the target voltage only once in each of the cases in which the input voltage Vi drops and the input voltage Vi rises. However, the control unit 13b may make a determination using a plurality of threshold values in each of the cases in which the input voltage Vi drops and the input voltage Vi rises and may stepwise switch the target voltage. For example, when the battery is nearly in a fully charged state, the control unit 13b sets the target voltage of the voltage drop circuit 13a to the required voltage Vo1, and, when the input voltage Vi falls below the first threshold value Vi1, the control unit 13b switches the target voltage to the voltage Vo2 which is lower than the required voltage Vo1. When the input voltage Vi further falls below a third threshold value Vi3 which is lower than the first threshold value Vi1, the control unit 13b switches the target voltage to a voltage Vo3 which is lower than the voltage Vo2. After that, when the input voltage Vi is equal to or higher than a fourth threshold value Vi4 (where Vi3<Vi4<Vi1), the control unit 13b again switches the target voltage to the voltage Vo2, and, when the input voltage Vi further rises to be equal to or higher than the second threshold value Vi2, the control unit 13b switches the target voltage to the required voltage Vo1. In this way, electric power can be supplied to the load 14 while maintaining the output voltage Vo as high as possible in accordance with the change in the input voltage Vi.

Further, the control unit 13b may change the threshold values such as the first threshold value Vi1 and the second threshold value Vi2 and the target voltages of the voltage drop circuit 13a such as the voltage Vo1 and the voltage Vo2 described above depending on the temperature in the electric device 1. The reason is that the relationship between the remaining charge and the battery voltage of the secondary battery 11 changes depending on the ambient temperature.

Further, the electric device 1 often includes a plurality of loads 14 which have different required voltages Vo1 and circuit characteristics, respectively. In order to supply electric power to the plurality of loads 14 independently from one another, it is necessary for the power supply circuit 13 to include a plurality of voltage drop circuits 13a correspondingly to the plurality of loads 14, respectively. In this case, the threshold values such as the first threshold value Vi1 and the second threshold value Vi2 and the target voltages of the voltage drop circuit 13a such as the voltage Vo1 and the voltage Vo2 may be set differently with respect to each of the plurality of voltage drop circuits 13a.

While there have been described what are at present considered to be certain embodiments of the invention, it will be understood that various modifications may be made thereto, and it is intended that the appended claims coverall such modifications as fall within the true spirit and scope of the invention.

What is claimed is:
1. An electric device, comprising:
a secondary battery; and
a power supply circuit for dropping an input voltage which is input from the secondary battery to an output voltage and outputting the output voltage to a load,
wherein the power supply circuit drops the output voltage when the input voltage falls below a predetermined first threshold value from the output voltage output when the input voltage is equal to or higher than the predetermined first threshold value; and
wherein, when the input voltage transits from a state of being equal to or higher than the predetermined first threshold value to a state of being lower than the predetermined first threshold value, the power supply circuit waits until the state in which the input voltage is lower than the predetermined first threshold value continues for a predetermined first time period and then drops the output voltage.

2. The electric device according to claim 1, wherein the power supply circuit stepwise drops the output voltage in accordance with a drop of the input voltage.

3. The electric device according to claim 1,
wherein the output voltage of the power supply circuit, which is output when the input voltage is equal to or higher than the predetermined first threshold value, is a required voltage which is necessary for the load to normally operate, and
wherein the output voltage of the power supply circuit, which is output when the input voltage is lower than the predetermined first threshold value, is a voltage which is lower than the required voltage.

4. The electric device according to claim 1, wherein, when the input voltage transits from a state of being lower than a predetermined second threshold value to a state of being equal to or higher than the predetermined second threshold value, the power supply circuit waits until the state in which the input voltage is equal to or higher than the second threshold value continues for a predetermined second time period and then increases the output voltage.

5. The electric device according to claim 4, wherein the predetermined first time period is shorter than the predetermined second time period.

6. A method of controlling a power supply circuit, comprising:
dropping an input voltage that is input from a secondary battery to an output voltage and outputting the output voltage to a load;
dropping the output voltage when the input voltage drops below a predetermined first threshold value from the output voltage output when the input voltage is equal to or higher than the predetermined first threshold value; and
when the input voltage transits from a state of being equal to or higher than the predetermined first threshold value to a state of being lower than the predetermined first threshold value, waiting until the state in which the input voltage is lower than the predetermined first threshold value continues for a predetermined first time period and then dropping the output voltage.

7. The method according to claim 6, further comprising stepwise dropping the output voltage in accordance with a drop of the input voltage.

* * * * *